Nov. 24, 1959  C. V. NELSON ET AL  2,914,321
SHEET SEPARATING AND TRANSFER APPARATUS
Filed Jan. 6, 1958  6 Sheets-Sheet 1

INVENTORS
CHARLES V. NELSON
NORMAN E. NELSON
BY HAROLD E. ERICKSON
HENRY HELLENKAMP, JR.
Atty.

Nov. 24, 1959  C. V. NELSON ET AL  2,914,321
SHEET SEPARATING AND TRANSFER APPARATUS
Filed Jan. 6, 1958  6 Sheets-Sheet 2

INVENTORS
CHARLES V. NELSON
NORMAN E. NELSON
BY HAROLD E. ERICKSON
HENRY HELLENKAMP, JR.

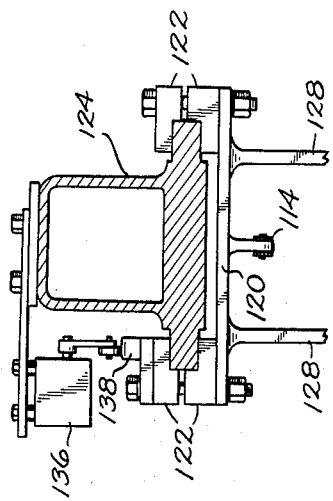
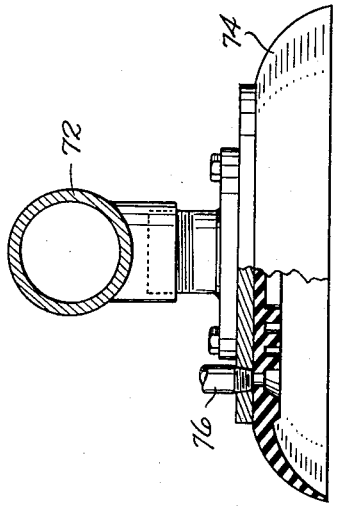
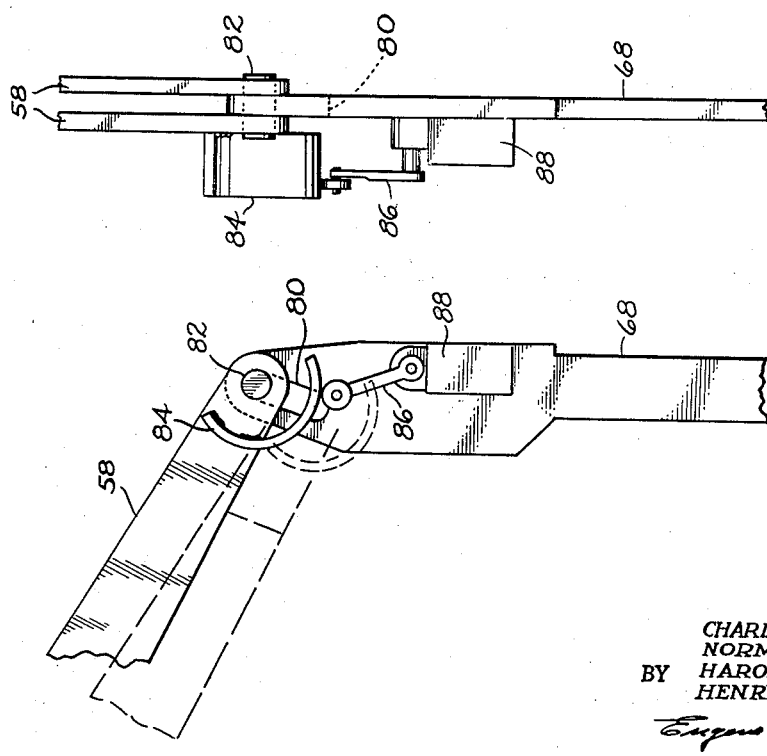

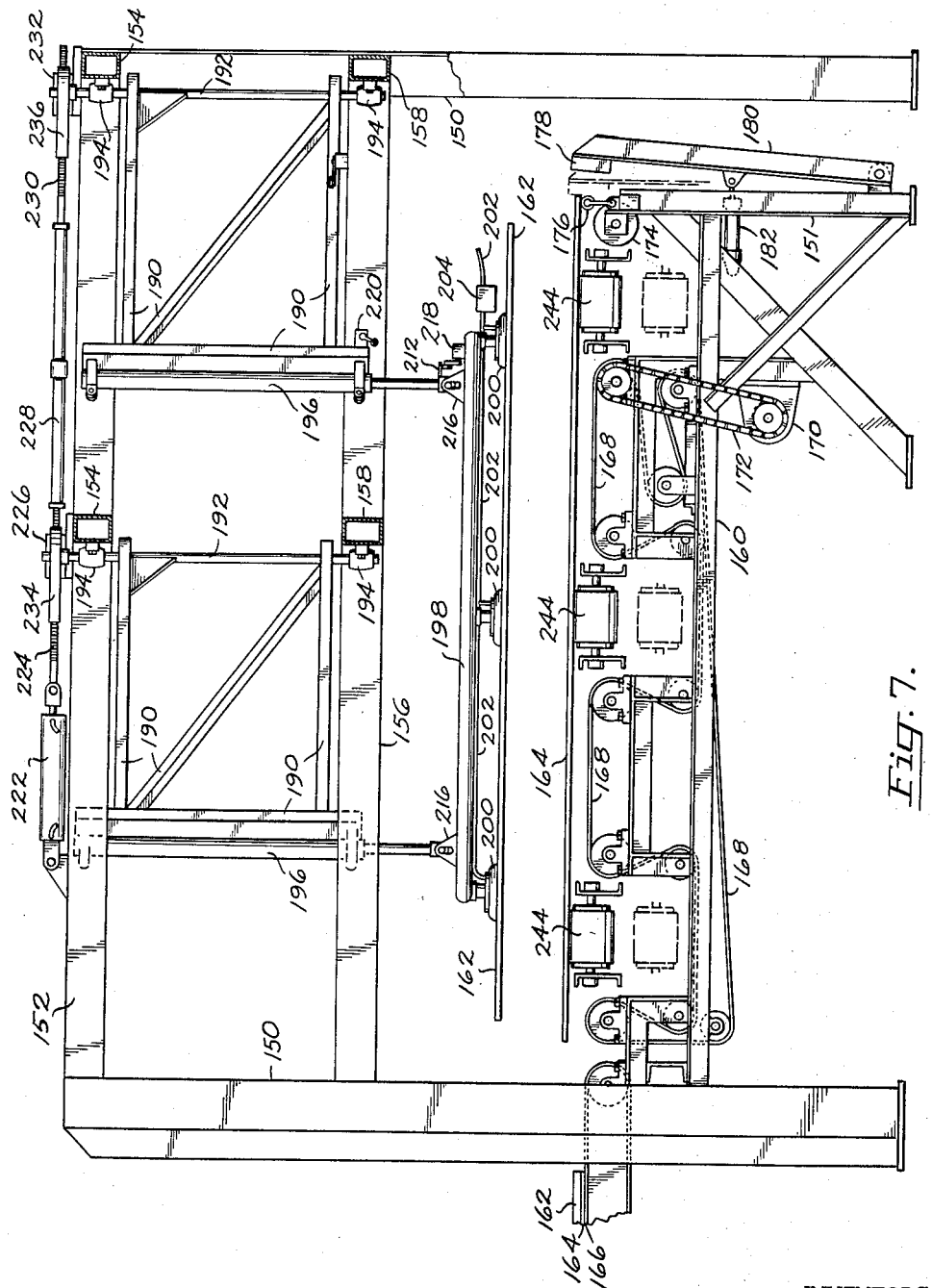

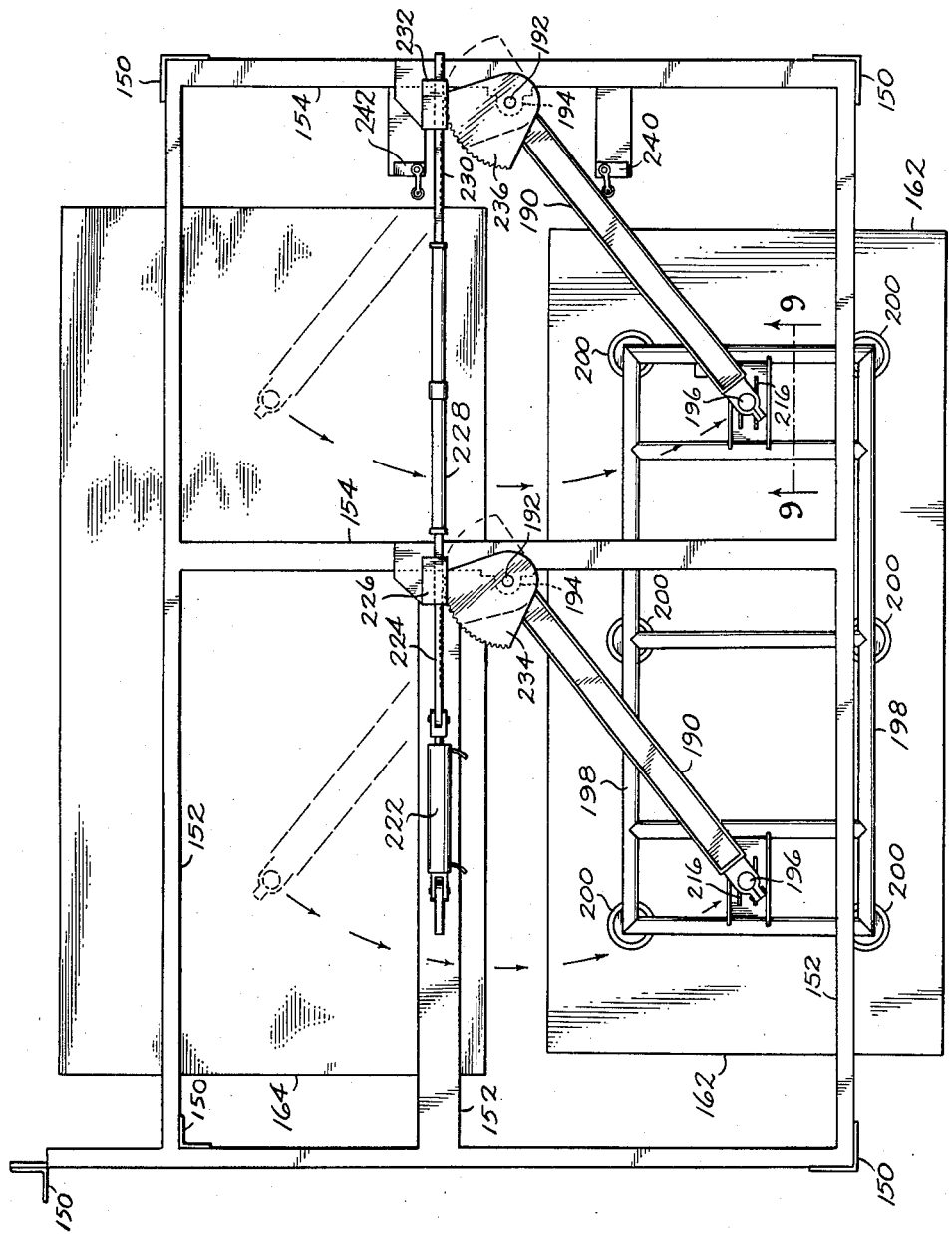

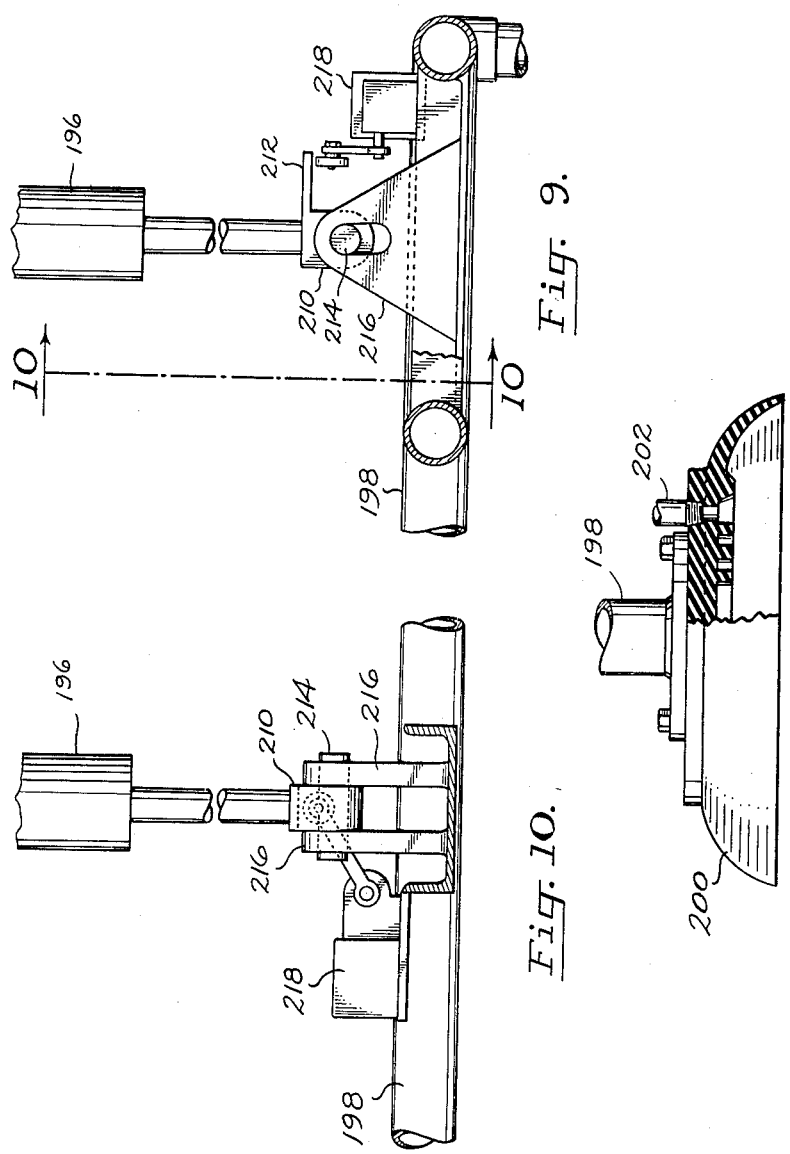

United States Patent Office 2,914,321
Patented Nov. 24, 1959

2,914,321

SHEET SEPARATING AND TRANSFER APPARATUS

Charles V. Nelson and Norman E. Nelson, Tacoma, Harold E. Erickson, Auburn, and Henry Hellenkamp, Jr., Tacoma, Wash.; said Charles V. Nelson and said Norman E. Nelson assignors to Dale L. Schubert, Tacoma, Wash.; said Erickson and said Hellenkamp assignors, by mesne assignments, to Industrial Development Co., Tacoma, Wash., a corporation of Washington Application January 6, 1958, Serial No. 707,184

13 Claims. (Cl. 271—5)

This invention relates to apparatus for separating self-sustaining, overlying sheet materials and for transferring them separately to subsequent operating units. It pertains particularly to apparatus for separating pressed composition boards from the caul plates upon which they are superimposed; for transferring the boards to conveyors which will carry them to conditioning or other processing units; and for transferring the caul plates to conveyors for recycling them to the apparatus employed in production of the boards.

In the production of composition boards, it is customary practice to build up mats of wood or other lignocellulose particles upon steel caul plates. The resulting assemblies then are conveyed to a multi-opening hot press wherein the mats are consolidated to the predetermined density and thickness.

Thereafter the resulting composition boards are removed from the press, still supported by the caul plates. Separation from the latter presents a problem in view of their large size and weight. Heretofore it has been common practice to "plow" the boards off, using a scraper inserted between the boards and the plates. However, the action of the scraper is prone to mutilate and break the boards, particularly along the edges and around the corners.

Accordingly it is the general object of the present invention to provide apparatus for separating large heavy sheets, e.g., wood composition boards, from supporting surfaces upon which they rest, e.g., metal caul plates, and for stacking the separated sheets or for transferring them to subsequent operating units without damaging them. It is a further object of the present invention to provide apparatus for effecting such separation and transfer at such a rate that the apparatus may be included in a production line for the continuous manufacture of one of the units being separated, e.g. the composition board.

The manner in which the foregoing and other objects of this invention are accomplished will be apparent from the accompanying specification and claims, considered together with the drawings wherein like numerals of reference indicate like parts and wherein:

Figures 3 and 4 are enlarged detail views, side and front elevation respectively, of a switch mechanism employed in the apparatus of Figures 1 and 2;

Figure 5 is a sectional view taken along line 5—5 of Figure 1;

Figure 6 is a detail view in elevation, partly broken away, of a suction cup assembly employed in the apparatus of Figures 1 and 2;

Figures 7 and 8 are side elevation and plan views respectively of the herein described sheet separating and transferring apparatus in another of its embodiments;

Figure 9 is an enlarged detail view of a switch mechanism employed in the apparatus of Figures 7 and 8, partly broken away and looking in the direction of the arrows of line 9—9 of Figure 8;

Figure 10 is an enlarged detail view of the switch mechanism of Figure 9 taken along line 10—10 of that figure; and Figure 11 is a detail view in side elevation, partly broken away, of a suction cup assembly employed in the apparatus of Figures 7 and 8.

Figure 1:
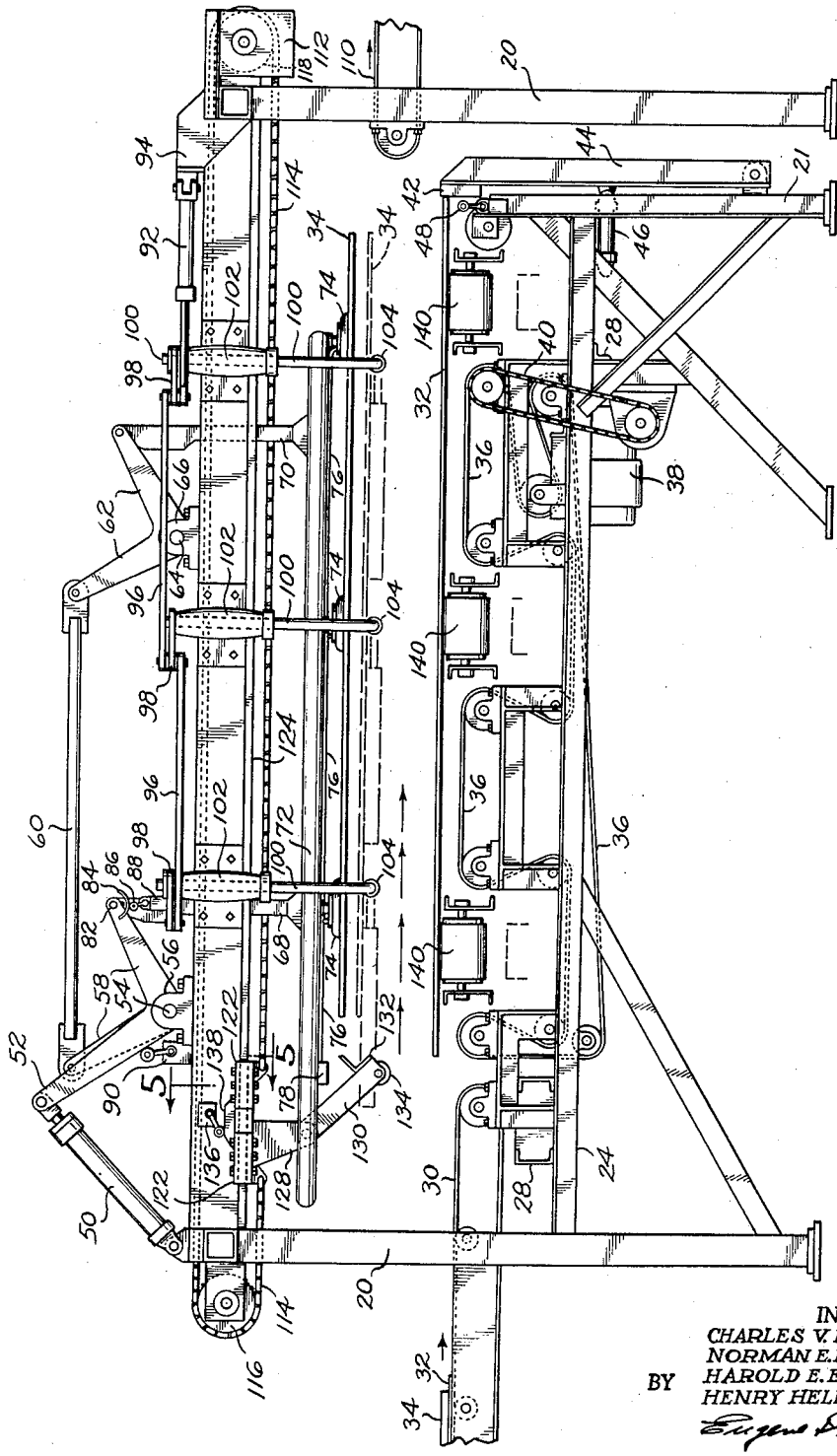
Figure 1 is a view in side elevation of the herein described sheet separating and transferring apparatus in one of its embodiments.

Generally stated, the herein described apparatus for separating overlying, self-sustaining sheets and for transferring them to other operating units located along separate travel paths comprises infeed conveyor means for conveying a pair of overlying sheets in a first horizontal travel path; sheet separating means for separating the sheets in a vertical plane, and first off bearing conveyor means stationed adjacent one of the sheets and working in a second horizontal travel path. Drive means are stationed adjacent the said sheet and are operative to transfer it to the first off bearing conveyor means.

Second horizontal off bearing conveyor means are stationed adjacent the other sheet and work in a third horizontal travel path. Second drive means adjacent the said other sheet are operative to transfer it to the second off bearing conveyor means, thereby separating the sheets and conveying them individually along the chosen travel paths.

Considering the foregoing in greater detail and with particular reference to the drawings:

*The apparatus of Figures 1–6*

In the embodiment of Figures 1–6, the overlying sheets after separation from each other are conveyed along substantially aligned separate travel means, thereby conserving plant work space.

The apparatus of our invention is supported by a frame including the uprights 20, 21, the upper spaced longitudinal members 22, the lower spaced longitudinal members 24, the upper spaced transverse members 26, and the lower spaced transverse members 28. One end of an infeed conveyor comprising an endless belt 30 is supported by this frame.

Belt 30 conveys into the apparatus overlying sheet assemblies such as a caul plate 32 having superimposed thereon a pressed composition board 34. These assemblies may represent the charge of a multi-opening composition board hot press and travel along belt 30 at spaced intervals. As the overlying sheets enter the apparatus, they are transferred to an interrupted endless belt 36 carried by suitably mounted pulleys and driven by motor 38 and drive chain 40.

When the sheets have been fully introduced into the apparatus, they contact a bumper 42 fixed to the upper ends of vertical arms 44. The lower ends of the latter are pivoted to frame members 21. A fluid operated cylinder 46 is connected to the arms so that they may be moved between the advanced position illustrated in Figure 1 wherein the sheets contact bumper 42, and a retracted position wherein the bumper clears the sheets so that one or both of the latter may be removed from the apparatus without interference.

As the sheets approach their end position on belt 36, they contact a limit switch 48. This arrests the motion of the belt. It also initiates the operation of means for separating the overlying and underlying sheets from each other.

Thus there is energized a fluid operated cylinder 50 which is pivotally connected to the frame and the piston rod of which is pivoted to lever 52. The latter is rigid to a shaft 54 mounted in bearings 56 supported by the frame.

Also rigid to shaft 54 are a pair of spaced, bell crank levers 58. The upper ends of these levers are interconnected through pivotally mounted connecting rods 60 with a second pair of bell crank levers 62. The latter are keyed to a shaft 64 which corresponds to shaft 54 and is journaled in bearings 66.

The forward ends of bell crank levers 58 are connected pivotally to vertical connecting rods 68 while the corresponding ends of bell crank levers 62 are pivoted to the vertical connecting rods 70. The latter pairs of rods support a boom frame 72.

Frame 72 mounts a plurality of spaced suction cups 74 which are interconnected by conduits 76 and which are connected to a source of vacuum through a vacuum operated switch 78. The construction of suction cups 74 is particularly evident in Figure 6. They operate to engage and hold the overlying sheet, e.g. composition board 34, when the boom frame is lowered by the action of cylinder 50.

Means are associated with the boom frame drive for arresting the downward travel of the frame as soon as suction cups 74 contact sheet 34. A suitable means for this purpose is illustrated in detail in Figures 3 and 4.

The upper end of vertical connecting rod 68 is formed with a slot 80 which receives a pin 82 carried by the forward end of bell crank lever 58. This construction makes possible relative movement of the bell crank lever and the connecting rod after the suction cups carried by the boom frame have come to rest on the upper surface of sheet 34.

Upon such relative movement, a cam 84, mounted on the side of the bell crank, engages the arm 86 of a switch 88. This switch is in an electric circuit with a solenoid operated valve controlling the operation of cylinder 50 and operates to shut off the valve when the cups have contacted the sheet.

Vacuum cups 74 are continuously evacuated through lines 76 or, in the alternative, are connected to a source of vacuum by a valve operated for example, by switch 88 so that vacuum is applied to the cups at the same time that downward motion of the boom frame is arrested. After the vacuum has built up in the cups to a predetermined level, vacuum operated switch 78 acts to reactivate cylinder 50, retracting the piston rod thereof and elevating the boom. Elevation of the latter continues until lever arm 52 contacts a limit switch 90 which stops the operation of cylinder 50 at a position wherein boom frame 72 is in the full line position of Figure 1.

Means thereupon are energized for locating off bearing conveying means beneath the elevated sheet. Such means are driven by a pair of fluid operated cylinders 92, the bases of which are pivotally connected to frame members 94.

The piston rods of cylinders 92 are pivotally connected to horizontally aligned link members 96 which in effect become linear extensions of the piston rods. Each of the link members is coupled to a lever arm 98 which in turn is rigid to a rock shaft 100 supported by and vertically mounted in a bearing member 102. A roller 104 is rotatably mounted on a horizontal shaft which is fixed substantially at right angles to each of vertical rock shafts 100.

Figure 2:
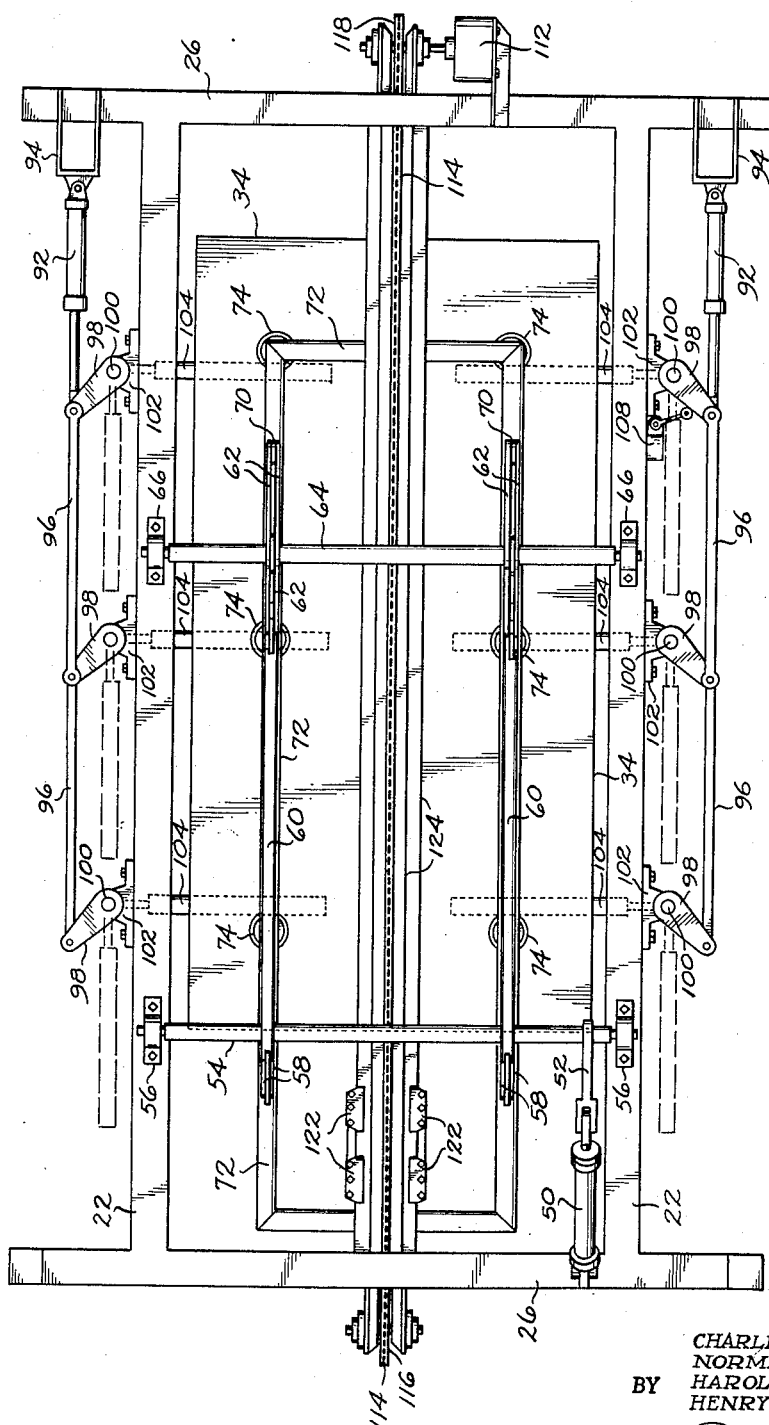
Figure 2 is a plan view of the apparatus of Figure 1.

Thus when cylinders 92 are actuated upon energization of limit switch 90, lever arms 98 are moved sufficiently to rotate horizontal rollers 104 through an angle of 90°, bringing them to the full line position of Figures 1 and 2 wherein they underlie sheet 34 in its elevated position.

Next the sheet is lowered until its rests upon the rollers. This sequence is initiated by operation of a limit switch 108 when it is contacted by the drive which shifts the position of the rollers. This switch actuates cylinder 50, causing extension of the piston rod thereof and hence lowering of boom frame 72 until suction cups 74 again are in contact with sheet 34.

Continued operation of cylinder 50 causes relative movement between crank 58 and vertical connecting rods 68 to operate limit switch 88 in the manner described above. This arrests the operation of cylinder 50 and releases the vacuum in the vacuum cups. Thereupon the circuit energized by the operation of switch 88 acts to retract cylinder 50, raising the boom frame 72 so that the suction cups are out of contact with the sheet.

Means then are provided for ejecting the sheet from the unit onto an off bearing conveyor 110 which is substantially aligned with infeed conveyor 30 but spaced vertically therefrom. The ejecting means is driven by a reversible motor 112 suitably mounted on the frame of the apparatus and driving an endless chain 114 which extends horizontally the length of the apparatus and which is supported by sprockets 116, 118.

Chain 114 drives an ejector trolley, the construction of which is illustrated in Figures 1 and 5. It comprises a base plate 120 upon which are mounted slide members 122. These slide upon a longitudinally extending track 124.

Also supported by plate 120 and extending downwardly therefrom are a pair of spaced plates 128. Pivotally mounted between these plates are a pair of arms 130 which mount between them a pivotally mounted, angled pusher 132 and a roller 134.

Hence upon actuation of motor 112 so that chain 114 is driven forwardly, angled pusher 132 contacts the trailing edge of sheet 34 and centers it automatically even though the edge is not always positioned in the same location, as when the sheet is warped or bent. Continued operation of the ejector trolley moves the sheet out of the apparatus and onto off bearing conveyor 110. Motor 112 then reverses itself automatically and returns the trolley to its starting position where it operates limit switch 136, which is contacted by a contact bar 138 carried by the trolley assembly.

While the foregoing sequence is occurring, the underlying sheet member, e.g. caul plate 32, is also being conveyed away from the assembly, but along a separate travel path. Thus at a suitable point in the sequence, for example when limit switch 90 is actuated for the first time upon lifting sheet 34 to its maximum elevation bumper 42 is retracted by the operation of cylinder 46. A cross conveyor 140, the units of which are interleaved between the segments of interrupted conveyor 36, then is elevated by a drive not illustrated to the full line position of Figure 1. The cross conveyor then carries the sheet away in a lateral direction after which it and bumper 42 are returned automatically to their original positions, ready for the introduction of another pair of overlying sheets.

*Operation of the apparatus of Figures 1–6*

Briefly reviewed, the operation of the apparatus of Figures 1–6 is as follows:

A pair of overlying sheets, for example, a pressed composition board overlying a metal caul plate, is introduced from infeed conveyor 30 on to longitudinal conveyor 36 until it contacts bumper 42. Thereupon boom frame 72 carrying suction cups 74 descends, engages the overlying sheet, and retracts until the overlying sheet 34 is in the full line position of Figure 1. Cylinders 92 then swing rollers 104 from the dotted line to the full line position of Figures 1 and 2, wherein they underlie the sheet.

Cylinder 50 again operates to lower the boom frame until sheet 34 rests upon the rollers. In both lowering motions of the boom frame, the motion of the frame is arrested by means of a switch operated by relative movement of arms 58, 68 (Figure 3) irrespective of the fact that the frame rest position is different in each of the operations.

Boom frame 72 then elevates and the trolley assembly including angled push plate 132 is driven forwardly by motor 112 and drive chain 114, pushing the sheet forwardly until it rests on and is conveyed away by off bearing conveyor 110. Roller arms 104 then return to the dotted line positions of Figures 1 and 2. The trolley also returns to its original position, rollers 134 tracking on the surface of the next sheet 34 and arms 130 pivoting upwardly to permit motion of the trolley while bringing the sheet up into position.

While this sequence is taking place, bumper 42 retracts and side conveyors 140 elevate, lifting the lower sheet 32 completely off conveyor 36. The side conveyors then move the sheet laterally until it is out of the unit. Thereafter they drop to their position of rest, and bumper 42 returns to its original position ready for the introduction of another composite sheet unit into the apparatus.

*The apparatus of Figures 7–11*

The apparatus of Figures 7–11 inclusive, is similar to that of the apparatus of Figures 1–6 inclusive, in that it has for its end object the separation of overlying sheets of material and for transferring the separated sheets to other locations along separate travel paths. However, it differs in two respects. First, the separate travel paths are laterally offset from each other, rather than aligned with each other. Secondly, the apparatus may be employed, if desired, for stacking separated units as well as for feeding them into a conveyor line.

The unit is supported on a frame which includes, for example, the uprights 150, 151, the upper longitudinal members 152, the upper transverse members 154, the intermediate longitudinal members 156, the intermediate transverse members 158, and the lower longitudinal members 160. As in the previously described embodiment, the overlying sheets of material such as a pressed fiberboard 162 superimposed upon a metal caul plate 164 are introduced into the assembly on an infeed conveyor 166. They are transferred to an interrupted endless conveyor 168 driven by motor 170 and drive chain 172.

As the sheet assemblies traverse the unit, their leading end crosses roller 174, trips a limit switch 176 and abut against a locating bumper 178. The latter is mounted on arms 180, the lower ends of which are pivotally connected to the frame. The arms are reciprocated by a cylinder 182 between the dotted line position of Figure 7, wherein the bumper block contacts the sheets, and the full line position of that figure wherein it is out of contact therewith.

Tripping of switch 176 actuates the means employed for separating the overlying sheets 162, 164 from each other. Swinging frames 190 are fixed respectively, to shafts 192 which are journaled in bearings 194 mounted on transverse frame members 154. Fluid operated cylinders 196 are mounted vertically on the outer ends of frames 190.

The piston rods of cylinders 196 are coupled to a boom frame 198 which supports a plurality of suction cups 200. These are connected in series by means of conduit 202 which includes a vacuum operated switch 204 and which connects them to a source of vacuum.

Vacuum cups 200 are adapted to contact and engage the upper surface of the overlying sheet 162. Accordingly, when limit switch 176 is tripped, it operates a valve connecting the cups to the vacuum source. It also adjusts the valve controlling the operation of cylinders 196 so that the piston rods thereof are extended. This action proceeds until the vacuum cups rest upon sheet 162. Continued extension of the rods thereupon actuates a switch mechanism which is illustrated particularly in Figures 9 and 10 and which serves to adjust the valve controlling cylinders 196 so that continued extension of the piston rod, and hence continued lowering of the boom frame, is arrested.

The outer end of the piston rod of each of cylinders 196 mounts a collar 210 having a laterally extending projection 212. Collar 210 mounts a transverse pin 214 which works in the slots of a pair of spaced, slotted standards 216 which extend upwardly from boom frame 198. This frame also mounts a limit switch 218, the operating arm of which is located directly below projection 212.

Accordingly, when the boom frame comes to rest on the sheet to be lifted, continued extension of the piston rods of cylinders 196 operates limit switch 218. This arrests further movement of the piston rods. It also makes possible stopping of the cylinders at various levels rather than always at a fixed level. This is of importance in the application of the apparatus to stacking of the sheets, as will be described below.

As a vacuum builds up in cups 200, a vacuum operated switch 204 is actuated. This in turn actuates cylinders 196, retracting the piston rods thereof and elevating the boom frame carrying the vacuum cups as well as the upper sheet 162 which they engage. In this way the latter sheet is separated from the lower sheet 164.

Next, means are applied for swinging frames 190 to the side of the unit, e.g. in a clockwise direction as viewed in Figure 8. This positions the upper sheet 162 for stacking, or conveying it away in a different travel path from that followed by the lower sheet 164.

The swinging movement of frames 190 is initiated by a limit switch 220 which is engaged by boom frame 198 as it is elevated. The switch in turn actuates a fluid operated cylinder 222 mounted on the frame of the unit. The piston rod of this cylinder is coupled to a first rack 224 which works in a first guideway 226. The outer end of rack 224 is linked through connecting rod 228 to a second rack 230 which works in a guideway 232.

Racks 224, 230 are substantially aligned with each other and each engages a quadrant gear 234, 236 respectively. These gears are keyed, respectively, to vertical shafts 192 which mount swinging frames 190. Accordingly, extension and retraction of the piston rod of cylinder 222 induces angular movement in frame 190, and sheet 162 which it supports, is moved laterally, as is particularly apparent from Figure 8.

Means then are provided for lowering frame 198 and sheet 162 to a predetermined level as required to deposit the sheet on a stack of similar sheets, or on an off bearing conveyor. This sequence is initiated by contact of swinging frame 190 with a limit switch 240. This results in the extension of the piston rods of cylinders 196, lowering frame 198 and sheet 162 until the latter comes to rest on a supporting surface.

Relative movement between the advancing piston rods and the now stationary frame, permitted by the slots in standards 216, again actuate switch 218. As a result, the downward motion of the sheet is stopped. Switch 218 also operates to vent the vacuum cups 200 to the atmosphere, so that they release sheet 162. It also actuates cylinders 196 in the reverse direction, elevating frame 198 until it again contacts limit switch 220, arresting further operation of cylinders 196.

Cylinder 222 now moves swinging frames 190, as well as frame 198 which they support, counterclockwise to the dotted line position of Figure 8. In this position, they contact another limit switch 242 which arrests the further action of cylinder 222, leaving the stationing frame 198 and vacuum cups 200 mounted thereon in position, ready for another operating sequence.

At an appropriate time, for example when switch 220 is first contacted by frame 198 as it elevates the separated sheet 162 above the supporting sheet 164, cylinder 182 may be actuated by switch 220 to swing bumper 178 outwardly, out of engagement with the underlying sheet 164. Operation of this switch also causes the elevation of continuously running cross conveyors 244 which are interleaved with the segments of interrupted conveyor 168. They elevate the sheet to the full line position of Figure 7 so that it is clear of conveyor 168 and may be conveyed away independently to a new location. Thereafter the cross conveyor and bumper return to their original positions, i.e. the dotted line positions of Figure 7, ready for the introduction of another pair of overlying sheets.

*Operation of the apparatus of Figures 7–11*

Briefly reviewed, the operation of the unit of Figures 7–11 is as follows:

The incoming work such as a pressed fiberboard 162 overlying a caul plate 164 is introduced into the unit on infeed conveyor 166. It is then transferred to conveyor 168, cross conveyor 244 being depressed, and comes to rest with its leading edge against bumper 178.

As it is thus positioned, cylinders 196 lower vacuum cups 200 until they are in contact with the upper sheet 162. After they engage the sheet the cylinders are retracted to elevate it and separate it from the underlying sheet.

After sheet 162 has reached its limit of elevation, cylinder 222, racks 224, 230 and quadrant gears 234, 236 shift swinging frame 190 to the full line position of Figure 8. This also moves vacuum cups 200 and the sheet which they support to a laterally offset position.

Cylinders 196 then are operated to lower the sheet until it comes to rest on a stack of similar sheets, or on an off bearing conveyor. The vacuum is released from the cups and cylinders 196 again actuated to lift frame 198 to its fully elevated position where operation of cylinder 222 swings it back to its original position, i.e. the dotted line position of Figure 8, ready for operation upon another sheet.

In the meantime, after separation of upper sheet 162 from lower sheet 164, bumper 178 is retracted, and lateral side conveyors 244 are elevated to the full line position of Figure 7. This lifts the sheet 164 clear of belt 168 which heretofore has supported it, and conveys it away to a new location.

Thus it will be apparent that by the present invention we have provided apparatus for separating large heavy sheets, e.g. wood composition boards, from supporting surfaces upon which they rest, e.g. metal caul plates, and for stacking the separated sheets, or transferring them to subsequent operating units. These operations may be effectuated without damaging the sheets. Furthermore, the apparatus separates and transfers the sheets at such a rate that it may be included to advantage in a production line for the continuous manufacture of one of the units being separated.

It is to be understood that the forms of our invention herein shown and described are to be taken as preferred examples of the same and that various changes in the shape, size and arrangement of parts may be resorted to without departing from the spirit of our invention or the scope of the subjoined claims.

Having thus described our invention, we claim:

1. Apparatus for separating overlying, self-sustaining sheets and for transferring them to other work areas along separate travel paths comprising infeed conveyor means for conveying at least two of the sheets in overlying relationship to each other in a first substantially horizontal travel path, sheet separating means disposed above the infeed conveyor means, sheet gripping means on the sheet separating means and disposed above and within the margins of the overlying sheet, means for moving the sheet separating means between a lowered position of gripping engagement of the sheet gripping means with the upper surface of the overlying sheet and an elevated position supporting the overlying sheet above the underlying sheet for separating the sheets in a vertical plane, first transfer means for moving the overlying sheet from its elevated position above the infeed conveyor means, and second transfer means for moving the underlying sheet from its position below the elevated position of the overlying sheet.

2. Apparatus for separating overlying, self-sustaining sheets and for transferring them to other work areas along separate travel paths comprising infeed conveyor means for conveying at least two of the sheets in overlying relationship to each other in a first substantially horizontal travel path, sheet separating means disposed above the infeed conveyor means, sheet gripping means on the sheet separating means and disposed above and within the margins of the overlying sheet, means for moving the sheet separating means between a lowered position of gripping engagement of the sheet gripping means with the upper surface of the overlying sheet and an elevated position supporting the overlying sheet above the underlying sheet for separating the sheets in a vertical plane, first off bearing conveyor means stationed adjacent the overlying sheet and working in a second horizontal travel path, first drive means adjacent said overlying sheet and operative to transfer it to the first off bearing conveyor means, second off bearing conveyor means stationed adjacent the underlying sheet and working in a third substantially horizontal travel path, and second drive means adjacent the underlying sheet and operative to transfer it to the second off bearing conveyor means.

3. The apparatus of claim 2 wherein the first and second travel paths are in substantial alignment with each other.

4. The apparatus of claim 2 wherein the first and second travel paths are parallel to but laterally offset from each other.

5. Apparatus for separating overlying, self-sustaining sheets comprising infeed conveyor means for conveying a stack of overlying sheets to a predetermined station, a boom frame positioned above the stack at said station, sheet engaging means on the boom frame, means for lowering the boom frame until the engaging means have releasably engaged the upper member of the stack, means for elevating the boom frame and the engaged sheet, roller means, means for moving the roller means beneath the elevated sheet, means for lowering the boom frame to an intermediate position wherein the sheet rests on the rollers, the sheet engaging means thereupon being released, trolley means positioned for pushing the sheet along the roller means, and means connected to roller means for retracting them to permit further lowering of the boom frame as required to engage and elevate another sheet.

6. The apparatus of claim 5 wherein the engaging means comprises a plurality of spaced vacuum cups.

7. The apparatus of claim 5 wherein the trolley means includes an angularly bent contact member for contacting an edge of the sheet and a pivotally mounted arm for supporting the contact member, the contact member acting to center the edge of the sheet which it contacts.

8. The apparatus of claim 5 wherein the means for raising and lowering the boom frame includes two relatively movable members, and control means operated by the relative movement of the same produced when one of the members becomes stationary and the other continues its movement.

9. The apparatus of claim 5 including off bearing conveyor means for conveying away the residual stack after removal of the upper sheet therefrom.

10. Apparatus for separating overlying self-sustaining sheets comprising infeed conveyor means, a boom, means for mounting the boom for both vertical and horizontally angular reciprocation, sheet engaging means on the boom positioned for releasably engaging the uppermost one of a plurality of stacked sheets supported by the infeed conveyor means, drive means for elevating the boom and the sheet engaged by the engaging means thereon, drive means for swinging the boom horizontally to an offset position, and means operative to lower the boom in said offset position and to release the sheet supported thereby.

11. The apparatus of claim 10 wherein the engaging means comprises a plurality of spaced vacuum cups.

12. The apparatus of claim 10 wherein the boom frame mounting and driving means includes a swinging frame supporting the boom, fluid operated cylinders mounted vertically on the swinging frame for raising and lowering the boom, and a fluid operated cylinder geared to the swinging frame for securing angular movement thereof.

13. The apparatus of claim 10 including side conveyor means operative to elevate from the infeed conveyor means the residual stack remaining after separation of the top member thereof, and to convey the same laterally to a selected work area.

References Cited in the file of this patent

UNITED STATES PATENTS

| | | |
|---|---|---|
| 2,634,036 | Griswold | Apr. 7, 1953 |
| 2,675,953 | Van Poolen | Apr. 20, 1954 |
| 2,683,560 | Keller | July 13, 1954 |
| 2,778,180 | Eyster | Jan. 22, 1957 |